United States Patent [19]

Derbyshire et al.

[11] 4,354,922
[45] Oct. 19, 1982

[54] PROCESSING OF HEAVY HYDROCARBON OILS

[75] Inventors: Francis J. Derbyshire, Ewing; Philip Varghese, Trenton; Darrell D. Whitehurst, Titusville, all of N.J.

[73] Assignee: Mobil Oil Corporation, New York, N.Y.

[21] Appl. No.: 249,576

[22] Filed: Mar. 31, 1981

[51] Int. Cl.³ .................... C10G 11/16; C10G 21/06
[52] U.S. Cl. .................................... 208/68; 208/59; 208/86; 208/87; 208/309
[58] Field of Search ................ 208/68, 86, 87, 309, 208/311, 251 R

[56] References Cited

U.S. PATENT DOCUMENTS

| | | | |
|---|---|---|---|
| 3,507,777 | 4/1970 | Hemminger | 208/86 |
| 3,511,774 | 5/1970 | Long et al. | 208/86 X |
| 3,948,755 | 4/1976 | McCollum et al. | 208/11 LE |
| 3,969,196 | 7/1976 | Zosel | 208/308 X |
| 4,062,758 | 12/1977 | Goudriaan et al. | 208/86 X |
| 4,090,947 | 5/1978 | Satchell | 208/56 |
| 4,201,660 | 5/1980 | Zosel | 208/86 |
| 4,290,880 | 9/1981 | Leonard | 208/309 |
| 4,292,168 | 9/1981 | Derbyshire et al. | 208/56 X |
| 4,303,497 | 12/1981 | Mitchell et al. | 208/56 X |

Primary Examiner—Delbert E. Gantz
Assistant Examiner—G. E. Schmitkons
Attorney, Agent, or Firm—Charles A. Huggett; Michael G. Gilman; Charles J. Speciale

[57] ABSTRACT

This invention provides an integrated process for upgrading a combination of crude petroleum residua, refractory bottoms from catalytic cracking operations, and coal to gasoline and middle distillate products.

The process involves dense-gas solvent extraction under supercritical conditions, cracking, and hydroconversion stages.

25 Claims, 1 Drawing Figure

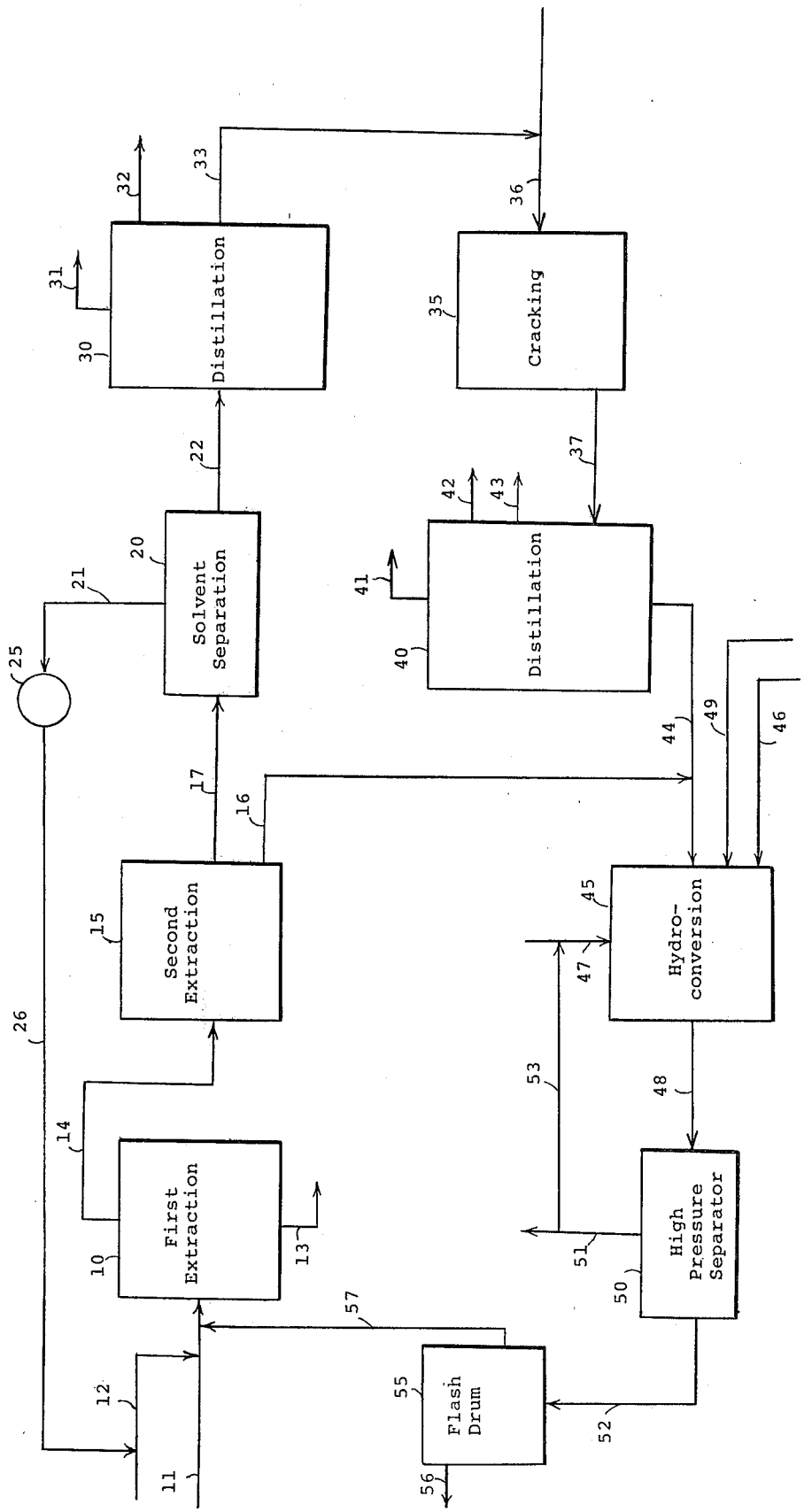

PROCESSING OF HEAVY HYDROCARBON OILS

BACKGROUND OF THE INVENTION

Residual petroleum oil fractions produced by atmospheric or vacuum distillation of crude petroleum are characterized by a relatively high metals content. This occurs because substantially all of the metals present in the original crude remain in the residual fraction. Principal metal contaminants are nickel and vanadium, with iron and small amounts of copper sometimes present.

The high metals content of the residual fractions generally preclude their effective use as chargestocks for subsequent catalytic processing such as catalytic cracking and hydrocracking, because the metal contaminants deposit on the special catalysts for these processes and cause the formation of inordinate amounts of coke, dry gas and hydrogen.

It is current practice to upgrade certain residual fractions by a pyrolytic operation known as coking. In this operation the residuum is destructively distilled to produce distillates of low metals content and leave behind a solid coke fraction that contains most of the metals. Coking is typically carried out in a reactor or drum operated at about 800°–1100° F. temperature and a pressure of 1–10 atmospheres. The economic value of the coke byproduct is determined by its quality, particularly its sulfur and metals content. Excessively high levels of these contaminants makes the coke useful only as low-valued fuel. In contrast, cokes of low metals content, for example up to about 100 ppm (parts per million by weight) of nickel and vanadium, and containing less than about 2 weight percent sulfur may be used in high-valued metallurgical, electrical, and mechanical applications.

Presently, catalytic cracking is generally accomplished by utilizing hydrocarbon chargestocks lighter than residual fractions which usually have an API gravity less than 20. Typical cracking chargestocks are coker and/or crude unit gas oils, vacuum tower overhead, and the like, the feedstock having an API gravity from about 15 to about 45. Since these cracking chargestocks are distillates, they do not contain significant proportions of the large molecules in which the metals are concentrated. Such cracking is commonly carried out in a reactor operated at a temperature of about 800°–1500° F., a pressure of about 1–5 atmospheres, and a space velocity of about 1–1000 WHSV.

The amount of metals present in a given hydrocarbon stream is often expressed as a chargestock's "metals factor". This factor is equal to the sum of the metals concentrations, in parts per million, of iron and vanadium plus ten times the concentration of nickel and copper in parts per million, and is expressed in equation form as follows:

$$F_m = Fe + V + 10(Ni + Cu)$$

Conventionally, a chargestock having a metals factor of 2.5 or less is considered particularly suitable for catalytic cracking. Nonetheless, streams with a metals factor of 2.5–25, or even 2.5–50, may be used to blend with or as all of the feedstock to a catalytic cracker, since chargestocks with metals factors greater than 2.5 in some circumstances may be used to advantage, for instance with the newer fluid cracking techniques.

In any case, the residual fractions of typical crudes will require treatment to reduce the metals factor. As an example, a typical Kuwait crude, considered of average metals content, has a metals factor of about 75 to about 100. As almost all of the metals are combined with the residual fraction of a crude stock, it is clear that at least about 80 percent of the metals and preferably at least 90 percent needs to be removed to produce fractions (having a metals factor of about 2.5–50) suitable for cracking chargestocks.

The automatic and environmental factors relating to upgrading of petroleum residual oils and other heavy hydrocarbon feedstocks have encouraged efforts to provide improved processing technology, as exemplified by the disclosures of various U.S. patents which include U.S. Pat. Nos. 3,696,027; 3,730,879; 3,775,303; 3,876,530; 3,882,049; 3,897,329; 3,905,893; 3,901,792; 3,964,995; 3,985,643; 4,016,067, and the like.

Another important trend with respect to the conservation and efficient conversion of energy resources is the development of improved technology to increase the yield of liquid fuels per barrel of gas oil feedstock processed in refinery operations.

In a conventional catalytic cracking system, a portion of the gas oil charge is refractory and not easily converted to lighter products. The refractory hydrocarbon fraction is recovered by distillation and is accumulated on a continuous basis. If the refractory material is recycled, it contributes to coke formation on the catalyst and yields little additional lighter product. The refractory material is also high in metals content which contributes to deactivation of cracking catalysts.

Another increasingly significant undertaking is the development of alternatives to petroleum as sources for fuels and chemical intermediates, e.g., coal in particular because of its relative abundance and availability.

Since most current energy utilization technology requires liquid energy media, it has become an important research and development objective to provide innovative means to convert coal into liquid sources of potential energy.

It was recognized by early workers that coal can be liquefied by controlled heating in the substantial absence of oxygen. The conversion products are a liquid and a char. Because of the new compelling economic factors, the technology of coal liquefaction and gasification has been expanding at an accelerated pace. Pioneer developments in the field are represented by Lurgi and Fischer-Tropsch technology.

A broad variety of organic solvents have been proposed for solubilizing coal. Most of the solvent media have disadvantages of high cost, poor solvation capacity for coal constituents, high viscosity, and the like. Coal tar, recycle coal oil, petroleum refinery byproduct streams, and propane-deasphalted petroleum tar, are among the coal solvation solvents disclosed in the prior art. Recent advances in coal liquefaction are described in U.S. Pat. Nos. 1,904,586; 1,955,041; 1,996,009; 2,091,354; 2,174,184; 2,714,086; 3,375,188; 3,379,638; 3,607,718; 3,640,816; 3,642,608; 3,705,092; 3,849,287; 3,870,621; inter alia.

There remains a need for improved technology for the conversion of coal into liquid carbonaceous products to complement and to enhance conventional petroleum-derived commodities.

Accordingly, it is an object of this invention to provide an improved method for upgrading heavy hydrocarbon oils for use as demetallized and desulfurized feedstocks for petroleum refinery cracking operations.

It is another object of this invention to provide a means for converting accumulated refractory petroleum residua from refinery operations into liquid fuel range distillates.

It is a further object of this invention to provide an improved method for converting coal and other solid carbonaceous materials into liquid hydrocarbon derivatives.

Other objects and advantages of the present invention shall become apparent from the accompanying description and illustrated data.

DESCRIPTION OF THE INVENTION

One or more objects of the present invention are accomplished by the provision of an integrated process for upgrading diverse refractory hydrocarbon oils which comprises (1) contacting a heavy hydrocarbon oil in a first extraction zone with a dense-gas fluid solvent under supercritical conditions to form a first solvent extract phase and a residual solids-enriched phase; (2) passing the said first solvent extract phase into a second extraction zone, and adjusting supercritical conditions of temperature and pressure to cause formation of a second solvent extract phase containing dissolved hydrocarbon solute having a metals factor of less than about 30 and a Conradson Carbon Residue content of less than about 10, and a separate asphaltic phase comprising heavy hydrocarbon constituents; (3) fractionating the second solvent extract phase in a separation zone to recover and recycle the dense-gas solvent, and to separate light constituents having a boiling point below about 500° F., and to provide a hydrocarbon oil fraction having a boiling point range above about 500° F.; (4) subjecting said above 500° F. range hydrocarbon oil fraction to cracking conditions, and fractionally distilling the crackate product mixture to yield 100°–650° F. range distillates, and a refractory hydrocarbon bottoms fraction; (5) charging said bottoms fraction, together with the asphaltic phase produced and separated in step (2), into a heating zone, wherein refractory constituents under hydrogen pressure are converted by hydrocracking to lighter products; and (6) fractionating the hydrocracked effluent to remove gaseous light ends and provide a liquid hydrocarbon fraction, end recycling said liquid hydrocarbon fraction as feedstock to the first embodiment zone in step (1).

The term "heavy hydrocarbon oil" is meant to include petroleum oil residua, shale oil and tar sand bitumen feedstocks, in which mixtures at least 75 weight percent of the constituents have a boiling point above about 650° F.

Typically, a heavy hydrocarbon oil suitable for upgrading in accordance with the present invention has a sulfur content of at least 3 weight percent, a metals content of at least 80 ppm, and a Conradson Carbon Residue content of at least 10 weight percent.

Dense-gas Solvent Extraction

An important aspect of the invention process is a two-stage selective fractionation of a heavy oil feedstock by means of dense-gas solvent extraction under supercritical conditions.

The solvent employed may be a single component or a mixture of components. With reference to the solvent, the term "supercritical conditions" means that the solvent is in a dense-gas state above its critical temperature. When a dense-gas solvent is at a temperature above its critical temperature, it cannot be liquefied by the application of any degree of increased pressure.

The advantages of dense-gas solvent extraction is the ability of compressed gas under supercritical conditions to solvate and dissolve liquid and solid organic materials. The solvent effect of compressed gases was first reported by Hannay and Hogarth [J. Proc. Roy. Soc., London, Series A, 29, 324 (1879)]. In "Liquid Fuels And Chemical Feedstocks From Coal By. Supercritical Gas Extraction", the state of the art relative to supercritical gas extraction is reviewed [Ind. Eng. Chem. Prod. Res. Dev., 16, No. 3 (1977)].

The basic principles of dense fluid extraction are outlined in the monograph "The Principles Of Gas Extraction" by P. Paul and W. Wise (published by Mills and Boon Limited, London, 1971).

In the Background of the Invention section of U.S. Pat. No. 3,948,755, the principles of dense fluid extraction are summarized in connection with the described process for recovering and upgrading hydrocarbons from oil shale and tar sands.

In principle, dense-gas extraction depends on the changes in the properties of a gas due to changes in the pressure. At temperatures below its critical temperature, the density of a gas varies in step functional fashion with changes in the pressure. Such sharp transitions in the density are associated with vapor-liquid transitions. At temperatures above the critical temperature of a gas, the density of the gas increases almost linearly with pressure as required by the Ideal Gas Law, although deviations from linearity are noticeable at higher pressures. Such derivations are more marked as the temperature of the gas is nearer, but still above, its critical temperature.

At a given pressure and at a temperature above the critical temperature of a compressed gas, the solvent power of the compressed gas should be greater the lower the temperature; and at a given temperature above the critical temperature of the compressed gas, the solvent power of the compressed fluid should be greater the higher the pressure.

The basis of separations by dense-gas extraction at elevated temperatures is that a substrate is brought into contact with a dense-gas solvent phase at an elevated temperature and material from the substrate is dissolved in the dense-gas phase. Then the dense-gas containing this dissolved material is isolated, and finally the isolated dense-gas is decompressed to a level where the solvent power of the fluid is minimized and the dissolved material is separated as a solid or liquid.

Some general conclusions based on empirical correlations have been drawn regarding the conditions for achieving high solubility of substrates in dense-gas phases. Thus, the solvent effect of a dense-gas depends on the physical properties of the solvent and of the substrate. This suggests that gases of different chemical nature but similar physical properties would behave similarly as dense-gas solvents. For example, it has been found that the solvent power of compressed ethylene and carbon dioxide is similar under supercritical conditions.

With respect to various applications of supercritical gas extraction, Zhuze applied dense-gas solvent extraction to the deasphalting of petroleum fractions using a propanepropylene gas mixture [Vestnik Akad. Nauk S.S.S.R., 29 (11), 47–52 (1959)]. Other chemical engineering applications which employ supercritical gas phase conditions are described in U.S. Pat. Nos.

2,665,238; 3,051,644; 3,453,206; 3,501,396; 3,586,621; 3,676,331; 3,733,259; 3,850,738; 3,880,945; 3,948,755; and 4,108,760; and in British Pat. Nos. 1,057,911 and 1,111,422.

Since dense-gas solvent extraction is depended mainly on physical rather than chemical properties, a wide variety of normally gaseous and liquid organic media are suitable for the technique. The critical temperature and critical pressure data of various organic gases and liquids are listed in Angew. Chem. Int. Ed. Engl., 17, 738–746 (1978). The list includes carbon dioxide, ammonia, methanol, propane, ethane, pentane, hexane, benzene, toluene, dichlorodifluoromethane, diethyl ether, and the like.

An extensive disclosure of organic gases and liquids suitable for application as supercritical fluids in dense-gas extraction is set forth in U.S. Pat. No. 4,108,760 with respect to the recovery of organic matter from oil shales and tar sands. The disclosure includes aliphatics, aromatics, alkanes, alkenes, heterocycles, halocarbons, and the like, and lists specific compounds such as sulfur dioxide, carbon disulfide, tetrahydrofuran, acetone, pyridine and methylene chloride.

Referring again to the present invention process, heavy oil feedstock is contacted with dense-gas solvent under supercritical conditions in a first extraction zone.

The contact of the fluid phases preferably is conducted in a continuous manner. The flow of the two fluid phases can be either uni-directional or countercurrent. Efficient admixing can be achieved by a high flow rate, or by baffles, a bed or layers of ceramic beads or saddles, or the like.

For a typical solvent medium such as pentane, the critical temperature of the solvent is between about 300°–800° F. The first extraction zone is maintained at a temperature which is between about 0°–100° F. above the critical temperature of the particular dense-gas solvent phase being employed.

The pressure in the first extraction zone preferably is maintained at or above the critical pressure of the dense-gas solvent phase. Depending on the particular dense-gas solvent being employed, the pressure normally will vary in the range between about 500–10,000 psi.

The conditions of temperature and pressure in the first extraction zone are such that the dense-gas solvent phase is in a supercritical fluid state, i.e., it is a fluid which can be densified but not liquefied by high pressure. The temperature and pressure are balanced so as to effect the desired selective extraction of the heavy hydrocarbon feedstock constituents.

The liquid hourly space velocity of the heavy hydrocarbon feedstock, as affected by the degree and efficiency of the extraction operation, will vary in the range between about 0.1–10, and on the average will be in the range between about 1–5. In a typical operation, the residence time of the feedstock in the first extraction zone will vary between about 10 minutes and one hour.

As exemplified by a unidirectional mode of operation, the dense-gas solvent and heavy hydrocarbon feedstock are admixed and entered into a first extraction zone. The dissolution of heavy hydrocarbon oil constituents into the dense-gas solvent phase occurs rapidly under supercritical conditions. Exclusive of inorganic solids, the proportion of organic constituents dissolved can exceed 80 weight percent and higher of the feedstock. It is desirable to extract substantially all of the organic content of the heavy hydrocarbon oil. Whatever solids are present in the feedstock remain almost exclusively in the residual solids-enriched phase. As described more fully hereinafter, the solids can include recycled organic solids (e.g., undissolved comminuted coal) and inorganic solids (e.g., spent cracking catalyst and coal ash).

The said residual solids-enriched fraction is withdrawn continuously from the lower section of the first extraction zone. It constitutes an excellent chargestock material for a coking or gasification operation. A gasification cycle is advantageous in conjunction with the present invention process since it provides a hydrogen supply for the hydroconversion phase of the process.

Separation Of Extractant Components

The dense-gas solvent laden with hydrocarbon solute is withdrawn continuously from the upper section of the first reaction zone, and entered into a second extraction zone. The purpose of the second extraction zone is to modify the supercritical conditions of the incoming dense-gas extractant to cause condensation and precipitation out of the dense-gas phase of solute hydrocarbon constituents which have a relatively high metals factor and Conradson Carbon Residue content. This newly formed liquid phase (i.e., one having a metals factor greater than about 30 and a CCR of greater than about 10) is cycled to the hydroconversion step of the process as described more fully hereinafter.

The dense-gas solvent phase which remains intact in the second extraction zone contains dissolved hydrocarbon constituents having a metals factor less than about 30 and a CCR of less than about 10. This second solvent extract phase is transferred to a separation zone, in which zone the dense-gas solvent component is recovered and recycled to the first extraction zone. The discharge of the solute from the dense-gas solvent phase is accomplished by (1) lowering the pressure in the separation zone down to about 100–500 psi, while maintaining the same temperature above the critical temperature of dense-gas solvent; or by (2) raising the temperature of the dense-gas solvent while maintaining the same pressure; or by (3) both raising the temperature and lowering the pressure in the separation zone.

A distillation column is employed to fractionate the hydrocarbon solute which has been discharged from the dense-gas solvent. After removal of light ends, a distillate fraction having a boiling range above about 500° F. is recovered and reserved as chargestock for the cracking step of the invention process.

During the recycle of the dense-gas solvent to the first extraction zone, it is highly advantageous to include a heat exchanger in the train to liquefy the said dense-gas solvent phase. This is accomplished by lowering the temperature of the dense-gas solvent phase to below its critical temperature. When the recycle solvent is in liquid form, it can be easily and economically repressured and then reheated to supercritical levels of pressure and temperature.

As a further embodiment, when the dense-gas solvent is a normally liquid medium such as pentane or toluene, the second solvent extract fraction recovered from the second extraction zone can be transferred directly to a distillation zone, without passing through an intermediate solvent separation zone.

In the distillation zone, the dense-gas solvent (e.g., pentane) is recovered as a distillate fraction and recycled to the first extraction zone of the process. As noted above, a distillate fraction having a 500° F. plus boiling range is recovered as chargestock for the subsequent cracking step of the process. Optionally, a bottoms fraction can be separated from the distillation zone and cycled to the hydroconversion zone of the process, i.e., step(5). For example, with an atmospheric distillation zone an 800° F. plus bottoms fraction can be recovered and cycled. In the case of a vacuum distillation zone, a 1000° F. plus bottoms fraction can be recovered and cycled to the hydroconversion zone.

Cracking Stage

As noted previously, the said 500° F. plus range hydrocarbon oil fraction (e.g., a 500°–1000° F. fraction) is subjected to cracking conditions, and thereafter fractionally distilled to yield gases, 100°–650° F. range distillates and a refractory hydrocarbon bottoms fraction. The feedstock to the cracking system normally will include a blend of hydrocarbons which are generated from a source other than the invention process steps described above.

A suitable cracking system is the conventional type of commercial fluidized catalytic cracking (FCC) or thermofor catalytic cracking (TCC) refinery operation.

In a FCC operation, preheated gas oil is charged to a reactor inlet line, where it picks up finely divided (e.g., 100 mesh) regenerated catalyst from the regenerator-catalyst standpipe and carries it into the reactor. Sensible heat of the gas oil charge plus sensible heat of hot catalyst from regeneration at temperatures upwards of 1200° F. supply sufficient heat to sustain the endothermic cracking reaction at a desired temperature. The upward flow of hydrocarbons in the FCC reactor is adjusted to maintain a fluidized bed of the finely divided catalyst, thereby promoting contact between catalyst and charge. In a typical operation, California heavy gas oil (650° F.–1000° F.) is converted over a zeolite catalyst (e.g., as described in U.S. Pat. No. 3,140,249) in an FCC operation at 950°–975° F., a weight hourly space velocity of 11 and a catalyst to oil ratio of 8. Reaction products are then passed into a distillation column, in the bottoms section of which they are quenched to about 600° F. to condense the heaviest hydrocarbons. Quenching is accomplished by circulating heavy condensate through a cooler and then back through the bottoms section of the column. The circulating condensate scrubs catalyst fines out of the up-flowing reaction products. The catalyst slurry so produced is sent to a settler to concentrate the catalyst, and the concentrated catalyst is separated and returned to the reactor. The oil separated from the concentrated bottoms is referred to as "FCC main column bottoms" or "FCC bottoms" or "clarified slurry oil", and is suitable for further processing in accordance with the practice of the present invention.

In a TCC operation, catalyst pellets of one-sixteenth inch diameter move downwardly through a reactor as a compact bed. In most modern TCC units, flow of gas oil charge is concurrent with catalyst flow in the reactor. As in FCC, heat of endothermic reaction is supplied by sensible heat of gas oil charge and catalyst. After charging wide cut gas oil (400°–1000° F.) from mixed Canadian crudes and employing a catalyst (e.g., as described in U.S. Pat. No. 3,140,249) at 875°–925° F. and a liquid hourly space velocity of 2 and a catalyst-to-oil ratio of 5, the reactor effluent is fractionated to provide a TCC bottoms fraction (i.e., "syntower bottoms") having a boiling range above 650° F., which is suitable for use as a chargestock for further processing in accordance with the present invention.

Hydroconversion Stage

The hydroconversion step of the invention process is conducted under relatively severe conditions. It serves to convert the chargestock so as to yield lower molecular weight hydrocarbons having reduced metals, sulfur, nitrogen and Conradson Carbon Residue contents. Further, highly refractory polyaromatic hydrocarbons are hydrogenated and cracked to lighter weight products.

As noted in the drawing, the chargestock to the hydroconversion zone is a blend comprising a cycle stream from the second extraction zone, a residual stream from the cracking zone, and optionally, a bottoms fraction from the first distillation zone.

A highly aromatic hydrocarbon residual stream such as a fluidized catalytic cracking (FCC) "Main column" bottoms or a thermofor catalytic cracking (TCC) "syntower" bottoms contains a substantial proportion of polycyclic aromatic hydrocarbon constituents such as naphthalene, dimethylnaphthalene, anthracene, phenanthrene, fluorene, chrysene, pyrene, fluoranthene, perylene, diphenyl, benzothiophene, and the like. Such refractory petroleum media are resistant to conversion to lower molecular products by conventional non-hydrogenative procedures.

The nominal properties of various highly aromatic refining petroleum streams prior to the removal of hydrocarbon substituents boiling below about 650° F. are as follows:

| Syntower Bottoms | |
|---|---|
| Sulpur | 1.13% |
| Nitrogen | 450 ppm |
| Pour Point | 50° F. |
| 5% Boiling Point | 640° F. |
| 95% Point | 905° F. |
| Conradson Carbon | 9.96 |

| FCC Clarified Slurry Oil | |
|---|---|
| Sulfur | 1.04% |
| Nitrogen | 440 ppm |
| Pour Point | 50° F. |
| 5% Boiling Point | 630° F. |
| 95% Point | 924° F. |
| Conradson Carbon | 10.15 |

| Heavy Cycle Oil | |
|---|---|
| Sulfur | 1.12% |
| Nitrogen | 420 ppm |
| Initial Boiling Point | 373° F. |
| 95% Point | 752° F. |
| Conradson Carbon | 10.15 |

Turbulent flow is desired in the hydroconversion zone. This is accomplished by flow rate control and by vessel design and by the incoming stream of hydrogen gas.

Hydroconversion conditions will vary in the range between about 700°–950° F. and 100–4000 psi. The LHSV will be in the range between about 0.1–10, and usually in the range between about 0.5–5. The rate of hydrogen circulation is between about 2000–12,000 scf/barrel.

As a further embodiment, the present invention contemplates the inclusion of coal or other solid hydrocarbonaceous material into the hydroconversion zone. The conditions in the hydroconversion zone are excellent for coal depolymerization and liquefaction. It is to be noted that the polycyclic aromatic hydrocarbon constituents in the liquid chargestock are hydrogen-transfer type of chemical structures, and promote the solvation and dissolution of coal.

The solubilization of coal is enhanced by the presence of reactive hydrogen. The requisite hydrogen is provided in the form of labile hydrogen in hydrogenated polycyclic aromatic hydrocarbons (generated in situ) which is transferred to the coal during the hydroconversion cycle, and/or the hydrogen is provided by the molecular hydrogen partial pressure in the system.

Besides increasing the process yield of $C_5$ to 650° F. boiling range distillates, the presence of pulverized coal in the hydroconversion zone has another distinct advantage. The porous nature of the comminuted coal particles, and the inherent content of inorganic material, have a catalytic effect on the hydrorefining and hydrocracking reaction mechanisms which are in progress.

The coal component can be charged to the hydroconversion zone in a weight ratio between about 0.05–1:1 in comparison with the liquid hydrocarbon chargestock. The said coal component can be any of a variety of carbonaceous materials which include bituminous and sub-bituminous types of coal, lignite, peat, and the like. The nominal analysis of typical coals are as follows:

| Sub-Bituminous | |
|---|---|
| Sulfur | 0.21% |
| Nitrogen | 0.88 |
| Oxygen | 15.60 |
| Carbon | 65.53 |
| Hydrogen | 5.70 |
| Ash | 3.99 |

| Lignite | |
|---|---|
| Sulfur | 0.53% |
| Nitrogen | 0.74 |
| Oxygen | 32.04 |
| Carbon | 54.38 |
| Hydrogen | 5.42 |
| Ash | 5.78 |

Ball mills or other types of conventional apparatus may be employed for crushing and pulverizing coarse coal in the preparation of the particulate coal feed for the hydroconversion stage of the process. The crushing and grinding of the coal can be accomplished either in a dry state or in the presence of a liquid such as the heavy hydrocarbon oil being charged to the hydroconversion zone. The average particle size of the coal feed is preferably below about 0.25 inches, such as finely divided bituminous coal which has a particle size of less than about 3 mesh (U.S. Sieve Series).

In another embodiment, this invention contemplates the inclusion in the hydroconversion zone of a low value catalytic substrate. Illustrative of suitable catalytic materials are spent cracking and hydrotreating catalysts, and metal ores such as manganese modules and pyrite. The quantity of catalytic substrate introduced into the hydroconversion zone will vary in the range between about 0.01–10 weight percent, based on the total weight of hydrocarbon chargestock being hydroconverted.

HYDROCRACKATE RECYCLE

The hydroconversion zone effluent stream is passed through a high pressure separator to remove hydrogen and other light gases.

The remaining product stream usually is a slurry of liquid hydrocarbon medium and suspended solids (e.g., undissolved coal and/or ash and/or spent catalyst substrate). The boiling range of the hydrocarbons in the hydrocrackate effluent is between about 100°–700° F. It is highly preferred that the said hydrocrackate effluent has an initial boiling point which is at least about 100° F. higher than the boiling point of the dense-gas solvent employed in the process. The overall efficiency of the invention process is improved when there is at least a 100° F. difference between the dense-gas solvent boiling point and the initial boiling point of the incoming feedstock to the first extraction zone. A flash-drum can be employed to remove light ends from the hydrocrackate effluent being recycled to the first extraction zone.

As further illustration of the invention process, the drawing is a schematic representation of an integrated multireactor system for upgrading of residua, catalytic cracking bottoms, and optionally, coal.

Referring to the drawing, a heavy hydrocarbon oil feedstock is charged through line 11 and admixed with dense-gas pentane solvent which is supplied via line 12.

The feedstock is a blend of approximately one volume of recycle hydrocrackate liquid delivered through line 57, and one volume of an Arabian light vacuum residual oil having the following nominal analysis:

| °API, gravity | 8.3 |
|---|---|
| H, wt % | 10.67 |
| S, wt % | 3.93 |
| N, wt % | 0.28 |
| CCR, wt % | 16.13 |
| V, ppm | 68 |
| Ni, ppm | 17 |
| MW | 810 |

First Extraction unit 10 is operated under supercritical conditions with respect to the dense-gas pentane solvent, i.e., an average temperature of 400° F. and an average pressure of 1200 psi. The liquid hourly space velocity of the feedstock is 2 (volume oil/volume Extraction unit 10/hour). The residence time of the feedstock in First Extraction unit 10 is about 10 minutes. The weight ratio of pentane solvent to feedstock is about 4:1.

An undissolved residual solids-enriched fraction is withdrawn continuously from First Extraction unit 10 through line 13. It constitutes approximately 8–10 weight percent of the feedstock which is being extracted. The solids-enriched fraction is reserved for gasification conversion to produce the hydrogen which is employed in the process.

A stream of dense-gas pentane extractant phase is withdrawn continuously from First Extraction unit 10 through line 14 and entered into Second Extraction unit 15. The formation of a separate asphaltic fraction is effected in Second Extraction unit 15 by adjusting the supercritical conditions to a temperature of about 440° F. and a pressure of about 1000 psi, as necessary to cause a selective separating out of asphaltic solute from the dense-gas pentane phase. On the average the asphaltic fraction represents about 30 weight percent of the total hydrocarbon charge in Second Extraction unit 15.

The asphaltic fraction is withdrawn from Second Extraction unit 15 and cycled via line 16 as chargestock to Hydroconversion unit 45.

The dense-gas pentane solvent (and its remaining content of hydrocarbon solute) passes out of Second Extraction unit 15 via line 17 and is entered into Solvent Separation unit 20. Substantially all of the hydrocarbon solute is discharged from the dense-gas pentane solvent phase and it forms a separate liquid phase. The discharge of solute is accomplished by depressurizing the system to about 200 psi at a temperature of about 400° F.

The depressurized dense-gas pentane solvent is withdrawn from Solvent Separation unit 20 through line 21 and passed through Heat Exchanger unit 25. The dense-gas pentane solvent is cooled to a temperature below about 100° F. to liquefy the solvent. The said liquid pentane is then repressured and reheated to supercritical levels and recycled via line 26 to First Extraction unit 10.

The liquid hydrocarbon stream recovered from Solvent Separation unit 20 is transferred through line 22 to Distillation unit 30 (atmospheric). Light gases are separated through line 31, 100°-500° F. range distillate is recovered from Distillation unit 30 through line 32, and 500° F. plus distillate is recovered through line 33 and reserved as blending chargestock for Cracking unit 35.

The distillate in line 33 is blended with conventional cracking chargestock and entered into FCC Cracking unit 35 via line 36, and a crackate product mixture is produced under conventional FCC conditions employing a zeolite catalyst.

The crackate product mixture is passed from Cracking unit 35 to Distillation unit 40 by means of line 37. Light ends, gasoline and middle distillate fractions are recovered from Distillation unit 40 via lines 41, 42, and 43, respectively. A bottoms fraction is withdrawn from Distillation unit 40 through line 44, and after a settling stage, is reserved as a clarified slurry oil chargestock (B.P. range of 650° F. plus) for Hydroconversion unit 45.

In one embodiment, Hydroconversion unit 45 is operated at 850° F. and 2500 psi in the presence of added inorganic catalyst, e.g., spent cracking catalyst from the FCC unit which is charged through line 46. Hydroconversion unit 45 is pressurized with hydrogen which is supplied through line 47. Baffles in Hydroconversion unit 45 maintain the chargestock slurry in a state of turbulence. The LHSV is about 2, the residence time of the chargestock slurry is about 30 minutes, and the oil to catalyst ratio is about 10 in Hydroconversion unit 45.

The hydrocrackate effluent is withdrawn through line 48 and passed through High Pressure Separator 50. Hydrogen and light ends are removed via line 51, and the remaining liquid hydrocarbon hydrocrackate (i.e., slurry admixture) is transferred via line 52 to Flash Drum unit 55. Light hydrocarbons boiling below 200° F. are withdrawn from Flash Drum 55 through line 56. The remainder of the hydrocrackate effluent is recycled through line 57 to First Extraction unit 10.

Hydrogen and other gases in line 51 are separated from the light ends and passed through a scrubbing stage to remove a substantial portion of hydrogen sulfide and other sulfur-containing compounds. The scrubbing is accomplished by contacting the gas stream with aqueous sodium hydroxide. A second scrubbing stage using pentane is employed to remove $C_{1-2}$ gases from the gas stream. The resultant scrubbed hydrogen gas stream is recycled via line 53 to Hydroconversion unit 45.

In another embodiment, finely divided coal or other hydrocarbonaceous solid is introduced through line 49 into Hydroconversion unit 45, either in place of or in addition to the spent catalyst component. Under the relatively severe conditions in Hydroconversion unit 45, substantial liquefaction of the coal is achieved.

Thus, the present invention integrated process is adapted to convert the combination of crude petroleum oil residua and refractory bottoms from refinery cracking operations and coal to gasoline and middle distillate range products.

What is claimed is:

1. An integrated process for upgrading diverse refractory hydrocarbon oils which comprises (1) contacting a heavy hydrocarbon oil feedstock in a first extraction zone with a dense-gas fluid solvent under supercritical conditions of temperature and pressure for said solvent to dissolve a portion of said oil feedstock and form a first solvent extract phase containing the dissolved oil portion and an undissolved residual solids-enriched phase; (2) passing the said first solvent extract phase into a second extraction zone, and adjusting supercritical conditions of temperature and pressure to change the solubility of said oil portion in said dense-gas fluid solvent and cause formation of a second solvent extract phase containing dissolved hydrocarbon solute having a metals factor of less than about 30 and a Conradson Carbon Residue content of less than about 10, and condense or precipitate from said first solvent extract phase a separate asphaltic phase comprising heavy hydrocarbon constituents; (3) fractionating the second solvent extract phase in a separation zone to recover the dense-gas solvent, light hydrocarbon constituents having a boiling point below about 500° F., and a hydrocarbon oil fraction having a boiling point range above about 500° F., and recycling the dense-gas solvent; (4) subjecting said above 500° F. range hydrocarbon oil fraction to cracking conditions to form a crackate product mixture, and fractionally distilling the crackate product mixture to yield 100°-650° F. range distillates, and a refractory hydrocarbon bottoms fraction; (5) charging said bottoms fraction, together with the asphaltic phase produced and separated in step (2), into a heating zone, wherein said charge under hydrogen pressure is converted by hydrocracking to a lighter hydrocarbon effluent having a boiling range of about 100°-700° F.; and (6) fractionating the lighter hydrocarbon effluent to remove gaseous light ends and provide a liquid hydrocarbon fraction boiling above about 200° F., and recycling said liquid hydrocarbon fraction as part of the feedstock to the first extraction zone in step (1).

2. A process in accordance with claim 1 wherein said heavy hydrocarbon oil feedstock in step (1) is a crude oil distillation residuum.

3. A process in accordance with claim 1 wherein said dense-gas fluid solvent in step (1) exhibits a critical temperature in the range between about 300°-800° F.

4. A process in accordance with claim 1 wherein the weight ratio of said dense-gas fluid solvent to hydrocarbon feedstock in step (1) is in the range between about 1–10:1.

5. A process in accordance with claim 1 wherein said dense-gas fluid solvent in step (1) comprises an aliphatic compound.

6. A process in accordance with claim 1 wherein said dense-gas fluid solvent in step (1) comprises an aromatic compound.

7. A process in accordance with claim 1 wherein said dense-gas fluid solvent in step (1) comprises at least one member selected from alkanes and alkenes.

8. A process in accordance with claim 1 wherein said dense-gas fluid solvent in step (1) comprises pentane.

9. A process in accordance with claim 1 wherein said dense-gas fluid solvent in step (1) comprises toluene.

10. A process in accordance with claim 1 wherein said dense-gas fluid solvent in step (1) comprises carbon dioxide.

11. A process in accordance with claim 1 wherein said dense-gas fluid solvent in step (1) comprises carbon disulfide.

12. A process in accordance with claim 1 wherein said dense-gas fluid solvent in step (1) comprises tetrahydrofuran.

13. A process in accordance with claim 1 wherein said dense-gas fluid solvent in step (1) comprises acetone.

14. A process in accordance with claim 1 wherein said dense-gas fluid solvent in step (1) comprises pyridine.

15. A process in accordance with claim 1 wherein said dense-gas fluid solvent in step (1) comprises methylene chloride.

16. A process in accordance with claim 1 wherein the above about 500° F. range hydrocarbon fraction in step (4) is blended with other hydrocarbon oil feedstock prior to the cracking cycle.

17. A process in accordance with claim 1 wherein the said cracking conditions in step (4) are fluidized catalytic cracking conditions.

18. A process in accordance with claim 1 wherein the said cracking conditions in step (4) are thermofor catalytic cracking conditions.

19. A process in accordance with claim 1 wherein the hydrocracking in step (5) is conducted at a temperature between about 700°–950° F. and a pressure between about 100–4000 psi.

20. A process in accordance with claim 1 wherein the chargestock to the heating zone in step (5) additionally includes comminuted coal.

21. A process in accordance with claim 1 wherein the chargestock to the heating zone in step (5) additionally includes an inorganic solid substrate selected from spent cracking catalysts, hydrotreating catalysts, and low value metal ores.

22. A process in accordance with claim 1 wherein the initial boiling point of the step (6) recycled liquid hydrocarbon fraction is at least about 100° F. higher than that of the dense-gas solvent employed in the process.

23. A process in accordance with claim 1 wherein the step (6) recycled liquid hydrocarbon fraction contains a suspension of solids.

24. A process in accordance with claim 1 wherein the residual solids-enriched phase recovered in step (1) is subjected to a coking or gasification treatment.

25. A process in accordance with claim 1 wherein the dense-gas solvent recovered in step (3) is condensed and recycled in liquid form.

* * * * *